US010003537B2

(12) United States Patent
O'Connor et al.

(10) Patent No.: US 10,003,537 B2
(45) Date of Patent: Jun. 19, 2018

(54) EGRESS PORT OVERLOAD PROTECTION FOR NETWORK PACKET FORWARDING SYSTEMS

(71) Applicant: IXIA, Calabasas, CA (US)

(72) Inventors: Robin O'Connor, Austin, TX (US); Costel Corciu, Bucharest (RO); Vlad Manaila, Bucharest (RO)

(73) Assignee: Keysight Technologies Singapore (Holding) Pte Ltd, Singapore (SG)

( * ) Notice: Subject to any disclaimer, the term of this patent is extended or adjusted under 35 U.S.C. 154(b) by 120 days.

(21) Appl. No.: 14/879,203

(22) Filed: Oct. 9, 2015

(65) Prior Publication Data
US 2017/0099224 A1 Apr. 6, 2017

(30) Foreign Application Priority Data
Oct. 1, 2015 (RO) .............................. A/00708/2015

(51) Int. Cl.
*H04L 12/803* (2013.01)
*H04L 12/26* (2006.01)

(52) U.S. Cl.
CPC ............ *H04L 47/125* (2013.01); *H04L 43/02* (2013.01); *H04L 43/0894* (2013.01)

(58) Field of Classification Search
None
See application file for complete search history.

(56) References Cited

U.S. PATENT DOCUMENTS

| 6,480,488 | B1 | 11/2002 | Huang |
| 6,532,212 | B1* | 3/2003 | Soloway ................. H04L 45/00 370/230 |
| 6,763,018 | B1 | 7/2004 | Puthiyandyil et al. |
| 7,260,638 | B2 | 8/2007 | Crosbie |
| 7,328,009 | B2 | 2/2008 | Takeda et al. |
| 7,373,412 | B2 | 5/2008 | Colas et al. |
| 7,567,504 | B2 | 7/2009 | Darling et al. |
| 7,594,009 | B2 | 9/2009 | Triulzi et al. |

(Continued)

OTHER PUBLICATIONS

U.S. Appl. No. 62/156,885, "Methods, Apparatus, and System for High Speed Intelligent Network Recorder With Relevant Data Time Window", filed May 2015.*

(Continued)

*Primary Examiner* — Faruk Hamza
*Assistant Examiner* — Thinh Tran (57) ABSTRACT

Systems and methods are disclosed to provide egress port overload protection for network packet forwarding systems. Input packets are received at one or more ingress ports and load balanced among a plurality of egress ports for the packet forwarding system. Load balanced packets associated with each egress port are then sampled to generate sampled load balanced packets that are output from the egress port. For certain embodiments, a sampling percentage is used for the packet sampling, and the sampling percentage for each egress port is set based upon a comparison of a current traffic rate for the egress port to a threshold rate for the egress port. The threshold rates for the egress ports are allowed to be configured through a user interface. Further, session and non-session traffic can be identified, and session aware load balancing and/or per-port packet sampling can be applied.

27 Claims, 7 Drawing Sheets

(56) References Cited

U.S. PATENT DOCUMENTS

| | | |
|---|---|---|
| 7,702,310 B1 | 4/2010 | Parks et al. |
| 7,742,406 B1 | 6/2010 | Muppala |
| 7,969,900 B2 | 6/2011 | Abdo et al. |
| 8,018,943 B1 | 9/2011 | Pleshek et al. |
| 8,027,323 B2 | 9/2011 | Aso et al. |
| 8,059,532 B2 | 11/2011 | Riddle et al. |
| 8,098,677 B1 | 1/2012 | Pleshek et al. |
| 8,270,942 B2 | 9/2012 | Zabawskyj et al. |
| 8,279,752 B1 | 10/2012 | Busch et al. |
| 8,391,174 B2 | 3/2013 | Schlansker et al. |
| 8,457,126 B2 | 6/2013 | Breslin et al. |
| 8,929,356 B2 | 1/2015 | Pandey et al. |
| 8,934,495 B1 | 1/2015 | Hilton et al. |
| 2005/0169270 A1 | 8/2005 | Mutou et al. |
| 2006/0002304 A1 | 1/2006 | Ashwood-Smith |
| 2009/0116489 A1* | 5/2009 | Hanks ............... H04L 47/10 370/394 |
| 2011/0286461 A1 | 11/2011 | Ichino et al. |
| 2013/0279371 A1 | 10/2013 | Takashima et al. |
| 2014/0056300 A1 | 2/2014 | Zhao et al. |
| 2014/0119203 A1* | 5/2014 | Sundaram ........... H04L 43/50 370/250 |
| 2015/0172219 A1 | 6/2015 | Johansson et al. |
| 2016/0065477 A1* | 3/2016 | White ............... H04L 47/125 370/237 |
| 2016/0328159 A1* | 11/2016 | Coddington ......... G06F 3/0613 |

OTHER PUBLICATIONS

Ixia Network Visibility Solutions, Anue GTP Session Controller 7433, Product Specifications, Document No. 915-6504-01 Rev. B, 3 pgs. (May 2013).

Ixia Anue GTP Session Controller, Take Control of GTP Monitoring to Improve Customer QoE and Maximize Network ROI, Solution Brief, Document No. 915-6606-01 Rev. A, 2 pgs. (Sep. 2013).

* cited by examiner

EGRESS PORT OVERLOAD PROTECTION FOR NETWORK PACKET FORWARDING SYSTEMS

RELATED APPLICATIONS

This application claims priority under 35 USC § 119 to Romanian Patent Application No. A/00708/2015 filed on Oct. 1, 2015, and entitled "EGRESS PORT OVERLOAD PROTECTION FOR NETWORK PACKET FORWARDING SYSTEMS," which application is hereby incorporated by reference in its entirety.

TECHNICAL FIELD OF THE INVENTION

This invention relates to managing packet flows for egress ports within packet forwarding systems and, more particularly, to managing packet flows associated with load balanced packets distributed among egress ports within packet forwarding systems.

BACKGROUND

Packet-based data networks continue to grow in importance, and it is often desirable to monitor network traffic associated with these packet-based networks on an ongoing basis. To meet these monitoring needs, copies of network packets can be forwarded to diagnostic network monitoring tools. Packets are often forwarded using network hubs, test access ports (TAPs), and/or switched port analyzer (SPAN) ports available on network switch systems. For example, certain network switch systems produced by Cisco Systems include SPAN ports to which traffic on the switches are mirrored. It is also noted that other packet monitoring or access methods may also be used to acquire copies of network packets being communicated within a network infrastructure.

To help alleviate the problem of limited access to network packets for monitoring, tool aggregation devices or packet broker devices have been developed that allow shared access to the monitored network packets. In part, these network packet broker devices allow users to obtain packets from one or more network monitoring points (e.g., network hub, TAP, SPAN port, etc.) and to forward them to different monitoring tools. Network packet brokers can be implemented as one or more packet processing systems in hardware and/or software that provide access and visibility to multiple monitoring tools. These network packet brokers can also aggregate monitored traffic from multiple source links and can load balance traffic-of-interest to various tools. The traffic-of-interest can be network packets that are selected by the packet brokers through packet filters and related packet forwarding rules that identify particular packets or packet flows from within the monitored network traffic as traffic-of-interest. Further, packet brokers may also include options to apply sampling of the monitored traffic, packet slicing, packet de-duplication, and/or other packet related processing to the received packet traffic.

Network traffic monitoring tools are often connected to egress ports for a packet forwarding system operating as a network packet broker, and packet traffic to these monitoring tools is often load balanced by the network packet broker. However, monitoring tools often have limits to the rate (e.g., bits-per-second) of traffic they can handle. For example, an input port for a particular monitoring tool may be configured to handle data rates of up to 10 Gigabits-per-second or up to 40 Gigabits-per-second. If data is sent to an input port for a monitoring tool at a rate higher than the data the input port is designed to handle, then the monitoring tool can suffer from incorrect or unpredictable behavior. As such, it is desirable to keep the data rate for an egress port on a network packet broker below the acceptable input data rate for a monitoring tool connected to that egress port so that port overload conditions will not exist at the egress port. This data rate control, however, is difficult for existing load balancers within network packet brokers particularly where network communications sessions are assigned to particular network monitoring tools, and varied data rates within any particular session can lead to wide variations in loads seen by such monitoring tools.

SUMMARY OF THE INVENTION

Systems and methods are disclosed to provide egress port overload protection for network packet forwarding systems. For disclosed embodiments, input packets are received at one or more ingress ports for a packet forwarding system, and these input packets are load balanced among a plurality of egress ports for the packet forwarding system such that each egress port is associated with a subset of load balanced packets. For each egress port, the subset of load balanced packets associated with the egress port is then sampled to generate sampled load balanced packets. The sampled load balanced packets for the egress port are then output from the egress port. For certain embodiments, a sampling percentage is used for the packet sampling, and the sampling percentage for each egress port is set based upon a comparison of a current traffic rate for the egress port to a threshold rate for the egress port. Further, the threshold rates for the egress ports are allowed to be configured through a user interface. In additional embodiments, session and non-session traffic are identified and session aware load balancing and/or packet sampling can be applied. Other features and variations can be implemented, if desired, and related systems and methods can be utilized, as well.

For one embodiment, a method is disclosed to manage egress port packet flows for a packet forwarding system including receiving input packets at one or more ingress ports for a packet forwarding system; load balancing at least a portion of the input packets among a plurality of egress ports for the packet forwarding system to generate a plurality of subsets of load balanced packets, each subset being associated with an egress port, and for each egress port: comparing a current traffic rate for the egress port to a threshold rate for the egress port, sampling the subset of load balanced packets associated with the egress port using a sampling percentage based upon the comparing to generate sampled load balanced packets, and outputting the sampled load balanced packets from the egress port.

In another embodiment, the method further includes providing a user interface to allow configuration of the threshold rate for each of the egress ports. In further embodiments, the threshold rate for each egress port is associated with a network monitoring tool coupled to the egress port. In still further embodiments, the sampling percentage for each egress port determines a percentage of the subset of load balanced packets associated with the egress port that are passed by the egress port. In additional embodiments, the sampling percentage for each egress port is 100 percent if the current traffic rate is less than the threshold rate for the egress port and is less than 100 percent if the current traffic rate is not less than the threshold rate for the egress port. In still further embodiments, the sampling percentage for each egress port is proportional to the threshold rate for the egress port divided by the current traffic rate for the egress port if the current traffic rate is not less than the threshold rate for the egress port.

In another embodiment, the method further includes filtering the input packets to generate packets representing traffic of interest (TOI), and wherein the load balancing comprises load balancing the TOI packets among the plurality of egress ports. In further embodiments, the filtering includes filtering the input packets with one or more filter engines having forwarding rules associated with one or more packet filters.

In another embodiment, the method further includes identifying within the input packets session traffic associated with one or more network communication sessions and indicating as non-session traffic input packets not identified to be associated with one or more network communication sessions. In further embodiment, the method includes generating hash signatures for the input packets and using the hash signatures to identify the session traffic. In still further embodiments, the method includes using the hash signatures to identify request/response pairs for non-session traffic, and the sampling drops or passes each request/response pair. In additional embodiments, the load balancing is applied to balance the session traffic and the non-session traffic among the egress ports, and the sampling for each egress port is applied to sample only one of session traffic or non-session traffic within the subset of load balanced packets. In still further embodiments, the sampling for each egress port is applied to sample session traffic and non-session traffic within the subset of load balanced packets, and the method further includes for each egress port sending at least one of session traffic to be dropped and non-session traffic to be dropped to another egress port within the packet forwarding system.

For one embodiment, a packet forwarding system is disclosed having managed egress port packet flows including one or more ingress ports configured to receive input packets, a plurality of egress ports, a load balancer coupled to receive at least a portion of the input packets and to distribute the received portion of input packets among the plurality of egress ports with a subset of load balanced packets being associated with each egress port, and a plurality of samplers. Each sampler is associated with an egress port and is configured to compare a current traffic rate for the egress port to a threshold rate for the egress port and to sample the subset of load balanced packets associated with the egress port using a sampling percentage based upon the comparison to generate sampled load balanced packets. And each egress port is configured to output the sampled load balanced packets from the sampler associated with the egress port.

In another embodiment, the packet forwarding system further includes a user interface configured to allow configuration of the threshold rate for each of the egress ports. In further embodiments, each sampler is configured to use the sampling percentage to determine a percentage of the subset of load balanced packets associated with the egress port that are passed by the egress port. In still further embodiments, each sampler is configured to set the sampling percentage to 100 percent if the current traffic rate is less than the threshold rate for the egress port and to set the sampling percentage for the egress port to less than 100 percent if the current traffic rate is not less than the threshold rate for the egress port. In additional embodiments, each sampler is configured to set the sampling percentage to be proportional to the threshold rate for the egress port divided by the current traffic rate for the egress port if the current traffic rate is not less than the threshold rate for the egress port.

In another embodiment, the packet forwarding system further includes one or more filter engines configured to filter the input packets to generate packets representing traffic of interest (TOI), and the load balancer is configured to receive and distribute the TOI packets among the plurality of egress ports. In further embodiments, the one or more filter engines are configured to apply forwarding rules associated with one or more packet filters.

In another embodiment, the packet forwarding system further includes a session processor configured to identify within the input packets session traffic associated with one or more network communication sessions and to indicate as non-session traffic input packets not identified to be associated with one or more network communication sessions. In further embodiments, the session processor is further configured to generate hash signatures for the input packets and to use the hash signatures to identify the session traffic. In still further embodiments, the samplers are configured to use the hash signatures to identify request/response pairs for non-session traffic and to drop or pass each request/response pair. In additional embodiments, the load balancer is configured to distribute session traffic and the non-session traffic among the egress ports, and each sampler is configured to sample only one of session traffic or non-session traffic within the subset of load balanced packets. In still further embodiments, each sampler is configured to sample session traffic and non-session traffic within the subset of load balanced packets, and each sampler is configured to send at least one of session traffic to be dropped and non-session traffic to be dropped to another egress port within the packet forwarding system.

Different or additional features, variations, and embodiments can also be implemented, if desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Systems and methods are disclosed to provide egress port overload protection for network packet forwarding systems. For disclosed embodiments, input packets are received at one or more ingress ports for a packet forwarding system, and these input packets are load balanced among a plurality of egress ports for the packet forwarding system such that each egress port is associated with a subset of load balanced packets. For each egress port, the subset of load balanced packets associated with the egress port is then sampled to generate sampled load balanced packets. The sampled load balanced packets for the egress port are then output from the egress port. For certain embodiments, a sampling percentage is used for the packet sampling, and the sampling percentage for each egress port is set based upon a comparison of a current traffic rate for the egress port to a threshold rate for the egress port. Further, the threshold rates for the egress ports are allowed to be configured through a user interface. In additional embodiments, session and non-session traffic are identified, and session aware load balancing and/or packet sampling is applied. Different features and variations can be implemented, as desired, and related systems and methods can be utilized, as well.

In operation, the disclosed embodiments help to protect egress ports for packet forwarding systems from exceeding threshold rates for the egress port and overloading network destinations, such as network monitoring tools, connected to the egress ports. This protection is achieved in part by providing dynamic packet sampling for each of the egress ports and individually adjusting the dynamic packet sampling for each egress port based upon the current traffic rate for the egress port. For example, load balanced packets for a particular egress port are adjusted by monitoring the current traffic rate on the egress port, comparing it to a configured threshold rate for the egress port, determining a sampling percentage for packet sampling based upon the comparison, and applying this sampling percentage so that only a percentage of the load balanced packets resulting from the load balancing are passed to the egress port. By providing this port-specific packet sampling for each egress port in addition to load balancing of input packets, egress ports are better protected from exceeding their configured threshold rates.

Figure 1:
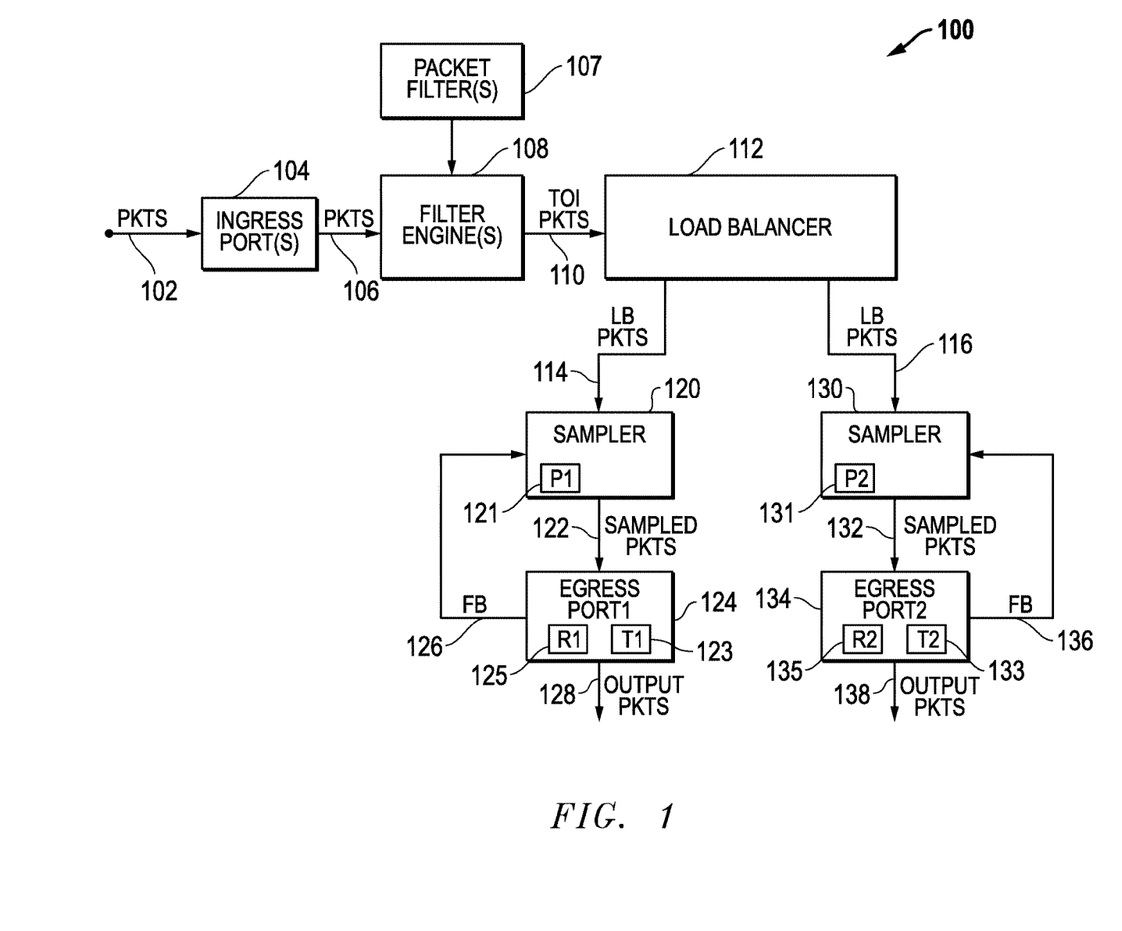
FIG. 1 is a block diagram of an example embodiment for a packet forwarding system including a load balancer and samplers for a plurality of egress ports.

FIG. 1 is a block diagram of an example embodiment for a packet forwarding system 100 including a load balancer 112 and samplers 120 and 130 for a plurality of egress ports 124 and 134. Packets 102 from one or more network sources are received at one or more ingress or input ports 104 for the packet forwarding system 100. The packets 106 are then filtered by one or more filter engines 108 to generate traffic of interest (TOI) packets 110. The filter engines 108 filter the input packets 106 based upon packet forwarding defined within one or more packet filters 107. Load balancer 112 receives these TOI packets 110 and load balances them among a plurality of egress ports, such as a first egress port 124 (PORT1) and a second egress port (PORT2) 134 as shown in example embodiment 100. As such, a subset of load balanced (LB) TOI packets 114 are output for the first egress port 124, and a subset of load balanced (LB) TOI packets 116 are output for the second egress port 134. As described herein, samplers 120/130 are included for each egress port 124/134 and operate to sample the load balanced packets forwarded from the load balancer 112 to the egress ports 124/134 and to limit this traffic when a current traffic rate 125/135 for an egress port 124/134 exceeds a threshold rate 123/133 configured for the egress port 124/134. As such, the output packets 128 from the first egress port 124 and the output packets 138 from the second egress port 134 are separately managed based upon their respective current traffic rates 125/135 and threshold rates 123/133. Although only two egress ports 124/134 are shown for the embodiment in FIG. 1, it is noted that additional egress ports and associated samplers can be provided within packet forward system 100 and can be managed similarly to egress ports 124/134.

Looking now to the samplers 120/130, the sampler 120 receives the subset of load balanced packets 114 for the first egress port 124 and applies the sampling percentage (P1) 121 to the load balanced packets 114 in order to generate sampled packets 122. As described further herein, the sampling percentage (P1) 121 can initially be set to 100 percent where all load balanced packets 114 are passed as sampled packets 122, and then the sampling percentage (P1) 121 can be adjusted to pass fewer packets when port overloading is detected. As also described further herein, the sampler 120 receives feedback (FB) 126 representing the current traffic rate (R1) 125 and the threshold rate (T1) 123 specified for the first egress port 124. The sampler 120 then compares this current traffic rate 125 to the threshold rate (T1) 123. If the current traffic rate 125 exceeds the threshold rate 123, the sampler 120 adjusts the sampling percentage (P1) accordingly and then samples the load balanced TOI packets 114 so that only this percentage (P1) 121 of load balanced packets 114 are output as sampled packets 122 to the first egress port 124.

Similarly, the sampler 130 receives the subset of load balanced packets 116 for the second egress port 134 and applies the sampling percentage (P2) 131 to the load balanced packets 116 in order to generate sampled packets 132. As described further herein, the sampling percentage (P2) 131 can initially be set to 100 percent where all load balanced packets 116 are passed as sampled packets 132, and then the sampling percentage (P2) 131 can be adjusted to pass fewer packets when port overloading is detected. As also described further herein, the sampler 130 receives feedback (FB) 136 representing the current traffic rate (R2) 135 and the threshold rate (T2) 133 specified for the second egress port 134. The sampler 130 then compares this current traffic rate 135 to the threshold rate (T2) 133. If the current traffic rate 135 exceeds the threshold rate 133, the sampler 130 adjusts the sampling percentage (P2) accordingly and then samples the load balanced TOI packets 116 so that only this percentage (P2) 131 of load balanced packets 116 are output as sampled packets 132 to the second egress port 134.

It is noted that the load balancer 112 can also receive and use the threshold rates 123/133 to facilitate the initial load balancing of the TOI packets 110 among the available egress ports 124/134 for the packet forwarding system 100. It is also noted that the load balancing of the TOI packets 110 by the load balancer 112 can be implemented, for example, by applying one or more hash algorithms to various fields, such as identifier (ID) fields in protocol headers, within the TOI packets 110 to generate one or more identification hash signatures for the TOI packets 110. Packets having the same or related identification hash signatures can then be identified and sent to the same egress port for receipt by the same monitoring tool. For example, as described further below, the hash signatures can be used to identify packets within the same communication session and/or to identify packets that are request/response pairs within the input packets. The load balancer 112 can then send packets identified to be within the same network communication session and/or packets identified to be request/response packet pairs to be sent to the same egress port.

As described herein, by providing a separate sampler 120/130 for each egress port and by applying the sampling percentages 121/131 in addition to the load balancing provided by the load balancer 112, the packet flows for the egress ports 124/134 can be better managed and controlled, for example, so that port overload conditions can be avoided. It is noted that the samplers 120/130 can be implemented as one or more processing devices that implement the sampling functionality described herein. It is further noted that the samplers 120/130 can also be included as part the load balancer 112, as part of the egress ports 124/134, or as part of other functional blocks within the packet forwarding system 100. Other variations can also be implemented while still taking advantage of the dynamic port-specific packet sampling described herein to provide egress port overload protection.

The packet filters 107, which can be used to generate packet forwarding rules to be applied to the filter engines 108, can rely upon various portions of the content of network packets for forwarding actions. For example, network packets typically include in part a link layer header (L2), a network layer header (L3), a transport layer header (L4) and a payload, as well as other network layers (e.g., layers within the Open Systems Interconnect (OSI) model for network communications). Information pertinent to forwarding the packet, such as source ID and destination ID and protocol type, is usually found in the packet headers. These packets may also have various other fields and information within them, such as fields including error check information, virtual local area network (VLAN) identifiers, and/or other information that may be matched and used for filtering. Further, information representing the source device may include items such as the IP address of the source device or the MAC (Media Access Control) address of the source device. Similarly, information representing the destination device may be included within the packet such as the IP address of the destination device. It is seen, therefore, that a wide variety of source and destination identifying information can be included within the packets and can be used to configure filtering by the packets filters 107 to generate the TOI packets 110.

It is noted that U.S. Pat. No. 8,018,943, U.S. Pat. No. 8,098,677, and U.S. Pat. No. 8,934,495 describe example embodiments for network tool optimizer systems that provide packet forwarding systems for tool aggregation and packet broker solutions and describe in part configuration of user-defined filters, automatic creation of filter engine forwarding rules, automatic handling of filter overlaps, graphical user interfaces (GUIs) for filter creation, and other features. U.S. Pat. No. 8,018,943, U.S. Pat. No. 8,098,677, and U.S. Pat. No. 8,934,495 are each hereby incorporated by reference in its entirety.

It is further noted that the packet forwarding system 100 including the load balancer 112 and the samplers 120/130 can be implemented using one or more programmable processing devices. For example, one or more processing devices, such as a processor, microcontroller, configurable logic device (e.g., CPLD (complex programmable logic device), FPGA (field programmable gate array)), and/or other processing device, can be used and programmed to implement the functionality described herein. It is further noted that software or other programming instructions used for the packet forwarding system 100 and/or its components, such as load balancer 112 and samplers 120/130, can be implemented as software or programming instructions embodied in a non-transitory computer-readable medium (e.g., memory storage devices, FLASH memory, DRAM memory, reprogrammable storage devices, hard drives, floppy disks, DVDs, CD-ROMs, etc.) including instructions that cause processing devices used by the packet forwarding system 100 to perform the processes, functions, and/or capabilities described herein. Further, the packet forwarding system 100 or its components can also be implemented as one or more virtual machine (VM) platforms operating within a virtual processing environment hosted by one or more host processing systems. For example, one or more of the components within the packet forwarding system 100 can be virtualized such that they operate as one or more VM platforms within a virtual environment. Virtual resources can be made available, for example, through processors and/or processing cores associated with one or more server processing systems or platforms (e.g., server blades) used to provide software processing instances or VM platforms within a server processing system. A virtual machine (VM) platform is an emulation of a processing system that is created within software being executed on a VM host hardware system. By creating VM platforms within a VM host hardware system, the processing resources of that VM host hardware system become virtualized for use within the network communication system. The VM platforms can be configured to perform desired functions that emulate one or more processing systems and that implement the functionality described herein.

Figure 2A:
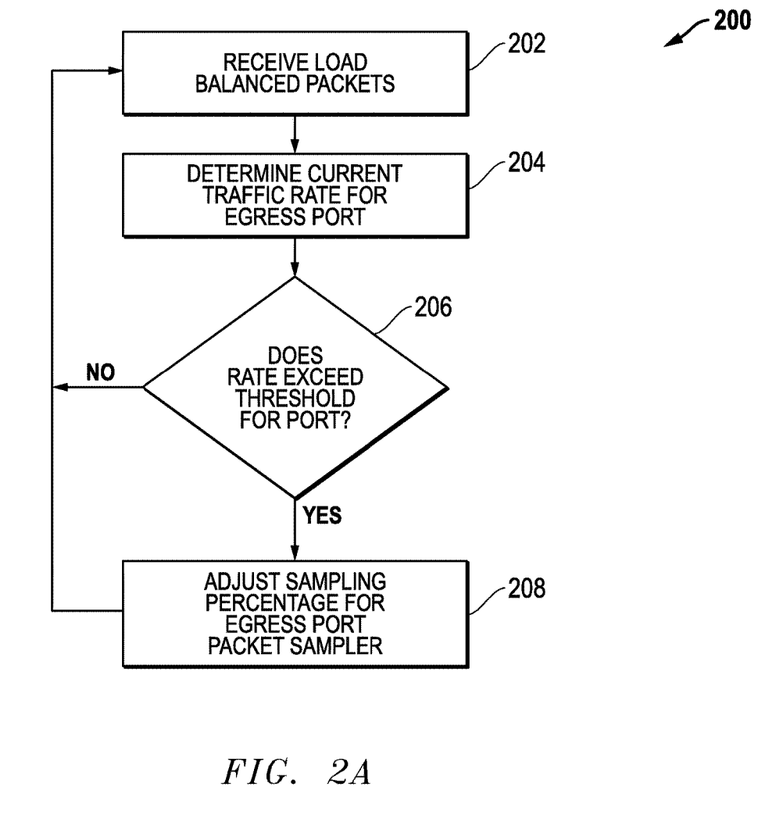
FIG. 2A is a process flow diagram of an example embodiment to adjust the sampling percentage for the sampler associated with an egress port.

FIG. 2A is a process flow diagram of an example embodiment 200 to adjust the sampling percentage for a sampler associated with an egress port. For this embodiment 200, the components shown in FIG. 1 are assumed to be within the packet forwarding system within which this embodiment 200 is operating to adjust the sampling percentages. In block 202, load balanced packets 114/116 are received by an egress port 124/134. In block 204, the current traffic rate 125/135 is determined for the egress port 124/134. In block 206, a determination is made whether the current traffic rate exceeds a threshold rate specified for the egress port 124/134. If "NO," then flow goes back to block 202. If "YES," then flow passes to block 208 where a sampling rate percentage is adjusted for the sampler 120/130 associated with the egress port 124/134. As described below for one example embodiment, the sampling percentage 121/131 is adjusted to be proportional to the threshold rate 123/133 for the egress port and to the current traffic rate 125/135 for the egress port 124/134. It is noted, however, that different adjustment techniques could also be applied to adjust the sampling percentage 121/131 when an overload condition is detected at an egress port 124/134 based upon the threshold rate 123/133 for that egress port 124/134.

Figure 2B:
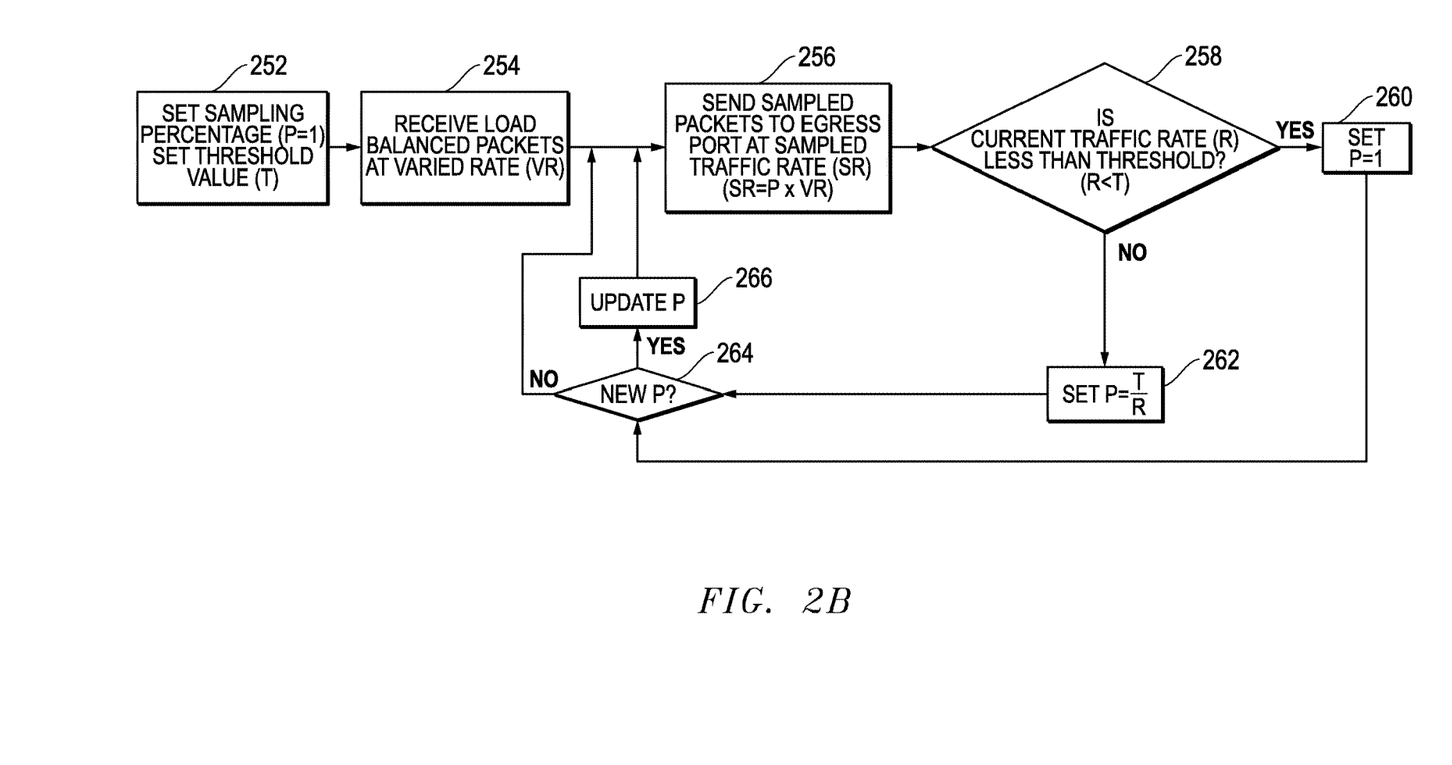
FIG. 2B is a process flow diagram of an example embodiment to dynamically adjust the sampling percentage applied to load balanced packets to generate sampled packets based upon a current traffic rate for an egress port as compared to a threshold rate for the egress port.

FIG. 2B is a process flow diagram of an example embodiment 250 to dynamically adjust the sampling percentage 121/131 applied to the load balanced packets 114/116 to generate the sampled packets 122/132. In block 252, the initial sampling percentage (P) 121/131 is set to "1" representing 100 percent, and the threshold value (T) 123/133 is set to the specified threshold rate (T) 123/133 for the egress port 124/134. In block 254, the load balanced packets 114/116 are received by the sampler 120/130 at rate that is typically a varied rate (VR) from the load balancer 112 based upon the dynamic load balancing provided by the load balancer 112. In block 256, sampled packets 122/132 are sent to the egress port 124/134 at a sampled traffic rate (SR). The current traffic rate 125/135 for the egress port 124/134 will typically be equal to this sampled traffic rate (SR), and this sampled traffic rate (SR) is determined by the sampling percentage (P) 121/131 applied to the load balanced packets 114/116. This sampled traffic rate (SR) can be represented by the equation: $SR = P \times VR$. Because the sampling percentage (P) 121/131 is initially set to 1 or 100 percent, all of the load balanced packets 114/116 will initially be sent to the egress port 124/134 as sampled packets 122/132.

Next, in block 258, a determination is made whether the current traffic rate (R) 125/135 at the egress port 124/134 is less than the threshold rate (T) 123/133 for the egress port 124/134 (e.g., is R<T). If "YES," then the rate limit for the egress port 124/134 is not currently being exceeded, and the sampling percentage (P) 121/131 is set to "1" (e.g., P=1). If "NO," then the rate limit for the egress port 124/134 has currently been reached or exceeded, and the sampling percentage (P) 121/131 is set proportionally based upon the threshold rate (T) 123/133 divided by the current traffic rate (R) 125/135 (e.g., P=T/R). From either block 260 or block 262, block 264 is then reached where a determination is made whether the sampling percentage (P) 121/131 set in block 262 or block 264 is different from its previous value. If "NO" and the new sampling percentage (P(n)) matches the old sampling percentage (P(n−1)), then flow passes back to block 256 with the sampling percentage (P) 121/131 left unchanged. If "YES" and the new sampling percentage (P(n)) is different from the old sampling percentage (P(n−1)), then flow passes to block 266 where the sampling percentage (P) 121/131 is updated with the new value. Flow then passes back to block 256.

The processing provided by steps 256, 258, 260, 262, 264, and 266 are repeated as the packet forwarding system 100 operates so that the sampling percentage (P) 121/131 is set to either P=1 or to P=T/R based upon dynamic comparisons of the sample rate (R) 125/135 to the threshold rate (T) 123/133 for the egress port 124/134. It is further noted that the update rate for the sampling percentage (P) 121/131 can be configured to be about 10-100 times the threshold rate (T) 123/133 for the egress port 124/134, although different update rates could also be used.

It is assumed for FIGS. 1 and 2A-B that the sampling percentages (P1/P2) 121/131 are being applied across all of the respective subsets of load balanced packets 114/116 received by the samplers 120/130 from the load balancer 112. However, for some implementations, it is desirable to identify session related packets and to process packets identifiable as part of a particular session different from packets not identifiable as part of a particular session.

Such session aware processing, for example, is useful where sessions are tracked within GTP (GPRS (General Packet Radio Service) Tunneling Protocol) network packet communications. GTP packet communications, for example, are often used in mobile communication networks for communications between user equipment (e.g., mobile handsets) and network gateway infrastructure (e.g., base stations and Internet gateways). User equipment (UE), such as mobile handsets, can have multiple active sessions at a time. To manage these GTP communication sessions, it is often desirable to have visibility into what sessions are active for each UE. When these sessions tracked, for example, a packet forwarding system can use this tracking information to forward packets associated with particular users and/or particular sessions to a single network monitoring tool that is connected to an egress port for the packet forwarding system. A session controller can be used to identify and track user sessions so that packets associated with a user session can be forwarded to a common network monitoring tool. It is noted that U.S. Pat. No. 8,929,356 and U.S. Published Patent Application Number 2015/0172219 describe example embodiments for session controllers that identify and track user sessions and for packet forwarding systems that distribute packets based upon these session among different network analysis tools. U.S. Pat. No. 8,929,356 and U.S. Published Patent Application Number 2015/0172219 are each hereby incorporated by reference in its entirety.

Figure 3:
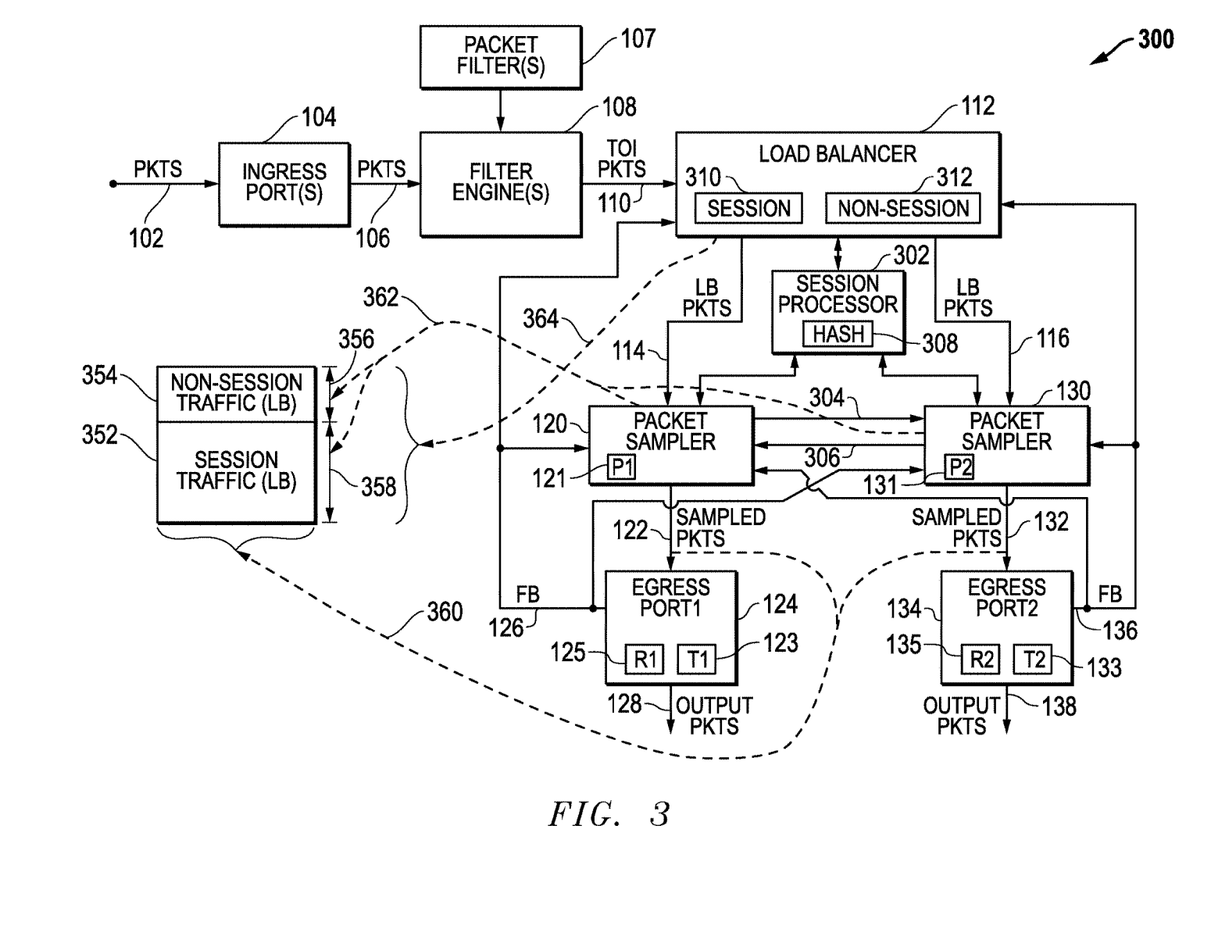
FIG. 3 is a block diagram of an example embodiment including session aware processing for the load balancer and/or the samplers.
Figure 4:
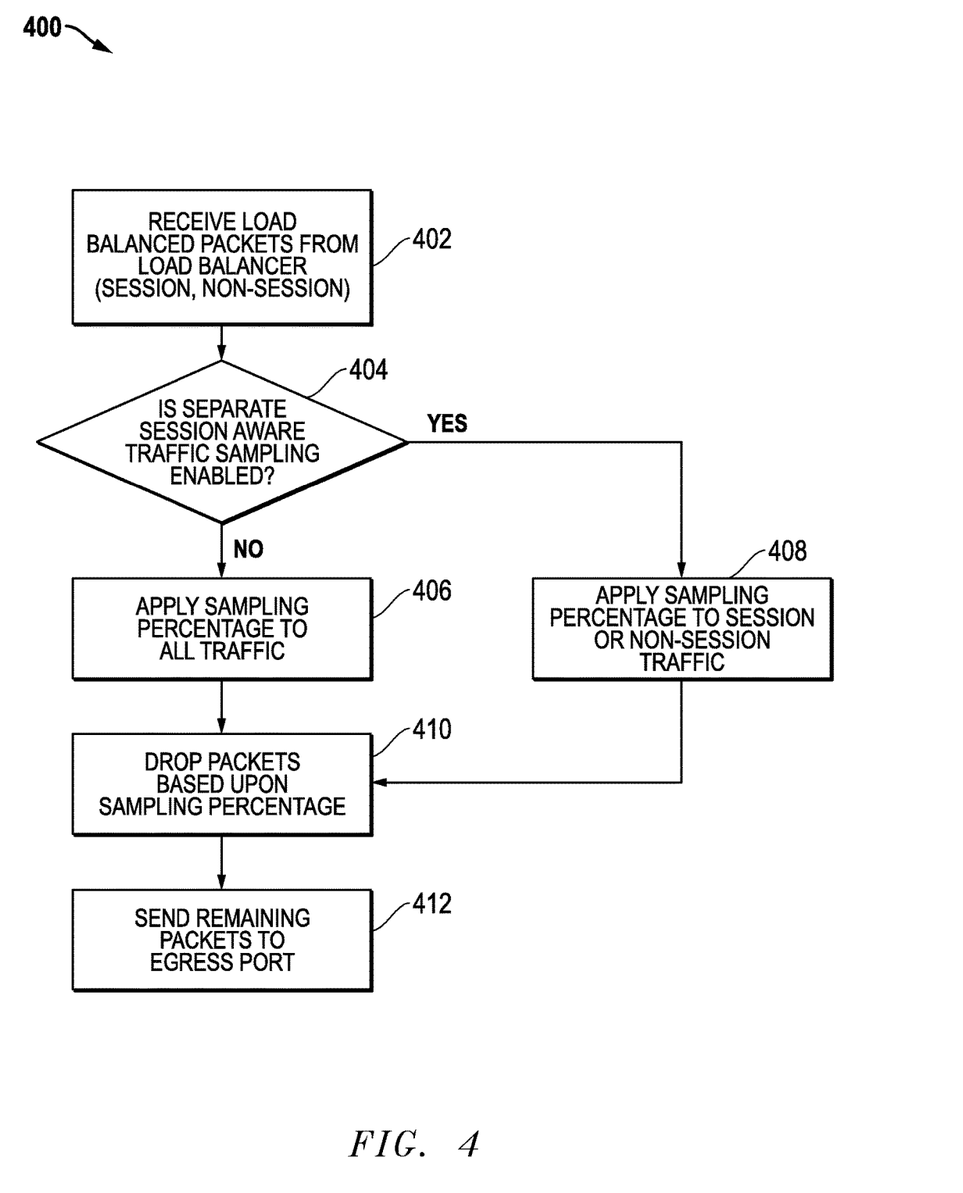
FIG. 4 is a process flow diagram of an example embodiment to apply a sampling percentage to all load balanced packets or alternatively only to the session packets or only to the non-session packets where such session aware traffic sampling is enabled.
Figure 5:
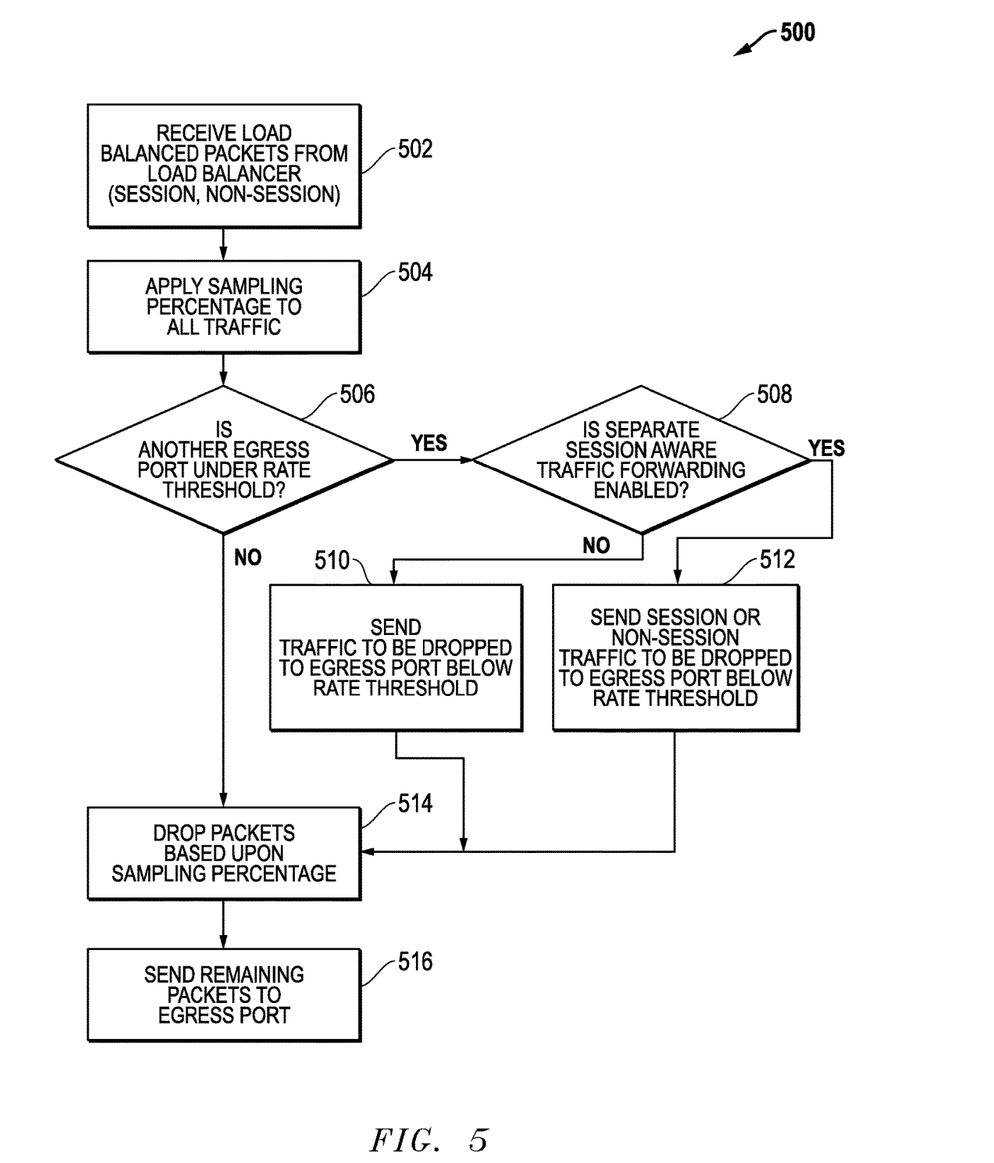
FIG. 5 is a process flow diagram of an example embodiment to forward all packets to be dropped by a sampler to another not overloaded egress port or alternatively to forward only session packets to be dropped or non-session packets to be dropped where such session aware traffic forwarding is enabled.

FIGS. 3-5 provide example embodiments where session aware processing is implemented. For these embodiments, the load balancer 112 preferably sends traffic within a particular session to the same egress port so that a single monitoring tool attached to this egress port can receive all traffic for that session. The session traffic will then be dropped or new session traffic will be added to the egress port in part based upon the session load balancing provided by the load balancer 112. Non-session traffic that is not identified as being part of a particular session is also load balanced among the egress ports 124/134 by the load balancer 112. All session and non-session traffic can then be subsequently managed by the samplers 120/130 using the sampling percentages 121/131. Alternatively, the sampling percentages 121/131 can be selectively applied by the samplers 120/130 only to the load balanced non-session traffic or only to the load balanced session traffic. As further described below, identification hash values for this session traffic or this non-session traffic can be generated and then used by the samplers 120/130 to identify packets within session traffic or to identify request/response pairs within non-session traffic to keep or drop during packet sampling by the samplers 120/130. Still further, packets to be dropped by a sampler 120/130 due to overloading at its respective egress port 124/134 can be forwarded to another egress port that is not overloaded. Alternatively, only session packets to be dropped or non-session packets to be dropped can be forwarded to another not overloaded egress port. Other variations can also be implemented while still taking advantage of the dynamic port-specific packet sampling described herein to provide egress port overload protection.

Now looking to FIG. 3, a block diagram is depicted of an example embodiment 300 including session aware processing for the load balancer 112 and the samplers 120/130. The embodiment 300 is similar to embodiment 100 of FIG. 1 except that a session processor 302 is now included to identify and track session packets 310. Packets not identifiable as part of a session are deemed non-session packets 312. The session processor 302 includes a hash generator 308 that can be used to generate hash signatures for the TOI packets 110. The load balancer 112 uses the hash signatures to determine if TOI packets belong to particular sessions. These hash signatures are also used to identify request/response pairs within non-session packets 312. The samplers 120/130 can then drop or pass both packets within any given request/response pair. It is also noted that the feedback information 126/136 including the current traffic rates 125/135 and the threshold rates 123/133 can be provided to load balancer 112 in addition to being provided to samplers 120/130.

In operation, the load balancer 112 allocates sessions to the egress ports 124/134 to balance the session traffic 310, and the load balancer 112 also allocates and balances non-session traffic 312 to the egress ports 124/134. The traffic 122/132 for each egress port 124/134, therefore, includes both load balanced session traffic 352 and load balanced non-session traffic 354, as indicated by dashed arrow 360. As represented by dashed arrow 364, the level 358 of load balanced session traffic 352 and the level 356 of load balanced non-session traffic 354 are dynamically managed by the load balancer 112. As represented by dashed arrows 362, the load balanced session traffic 352 and the load balanced non-session traffic 354 can both be managed by the samplers 120/130 using the sampling percentages 121/131. Alternatively, the samplers 120/130 can be configured to manage only the session traffic 352 or only the non-session traffic 354. For example, the samplers 120/130 can be configured to dynamically manage only the level 356 of load balanced non-session traffic 354, or the samplers 120/130 can be configured to dynamically manage only the level 358 of load balanced session traffic 352. Other variations could also be implemented while still taking advantage of the dynamic port-specific packet sampling described herein to provide egress port overload protection.

It is further noted that feedback information 126/136 can also be shared among the samplers 120/130 to allow packets that are to be dropped to instead be forwarded to another not overloaded egress port. For example, as shown in embodiment 300, feedback information 126 for the first egress port 124 is provided to the sampler 130 for the second egress port 134. Using this feedback information 126, the sampler 130 can determine if the egress port 124 is not overloaded and send session packets, non-session packets, or both session and non-session packets to be dropped to the sampler 130, as indicated by arrow 306, for subsequent transmission to egress port 134. Similarly, feedback information 136 for the second egress port 134 is provided to the sampler 120 for the first egress port 124. Using this feedback information 136, the sampler 120 can determine if the egress port 124 is not overloaded and send session packets, non-session packets, or both session and non-session packets to be dropped to the sampler 120, as indicated by arrow 304, for transmission output to egress port 124. This sharing of information among the egress ports 124/134, therefore, allows for further performance enhancement by re-allocating packets to be dropped by one of the samplers 120/130 to another non-overloaded egress port 120/130. Further, as indicated above, all packets to be dropped by a particular sampler 120/130 can be forwarded to another egress port that is not above its rate threshold overloaded, or alternatively only session packets or non-session packets to be dropped can be forwarded if such session aware traffic forwarding is enabled.

FIG. 4 is a process flow diagram of an example embodiment 400 to apply a sampling percentage to all load balanced packets or alternatively only to the session packets or only to the non-session packets where such session aware traffic sampling is enabled. For this embodiment 400, the components shown in FIG. 3 are assumed to be within the packet forwarding system within which this embodiment 400 is operating to apply load balancing and to apply sampling percentages. In block 402, load balanced packets 114/116 are received from the load balancer 112 that include both session packets 352 and non-session packets 354. In block 404, a determination is made whether separate session aware traffic sampling is enabled. If "NO," then flow passes to block 406 where the sampling percentage is applied to all traffic. If "YES," then flow passes to block 408 where sampling percentage 121/131 is applied only to session traffic 352 in one embodiment or is applied only to non-session traffic 354 in an alternative embodiment. From either block 406 or block 408, block 410 is reached where packets are dropped based upon the applied sampling percentage. Next, block 412 is reached where the remaining packets are sent to the egress port 124/134.

FIG. 5 is a process flow diagram of an example embodiment 500 to forward all packets to be dropped to another not overloaded egress port or alternatively to forward only session packets to be dropped or non-session packets to be dropped where such session aware traffic forwarding is enabled. For this embodiment 500, the components shown in FIG. 3 are assumed to be within the packet forwarding system within which this embodiment 500 is operating to apply load balancing, to apply sampling percentages, and/or to forward packets to be dropped. In block 502, load balanced packets 114/116 are received from the load balancer 112 that include both session packets 352 and non-session packets 354. In block 506, a determination is made whether another egress port is under its rate threshold and therefore not overloaded. If "NO," then flow passes to block 514 where packets are dropped based upon the sampling percentage 121/131. If "YES," then flow passes to block 508 where a determination is made whether separate session aware traffic forwarding is enabled. If "NO," then flow passes to block 510 where traffic to be dropped is sent to another egress port below its rate threshold. If "YES," then flow passes to block 512 where only session traffic to be dropped is sent to an egress port that is below its threshold rate in one embodiment or where only non-session traffic to be dropped is sent to an egress port that is below its threshold rate in an alternative embodiment. From block 510 or 512, flow then passes to block 514 where packets are dropped based upon the sampling percentage 121/131. Next, block 416 is reached where the remaining packets are sent to the egress port 124/134.

Figure 6:
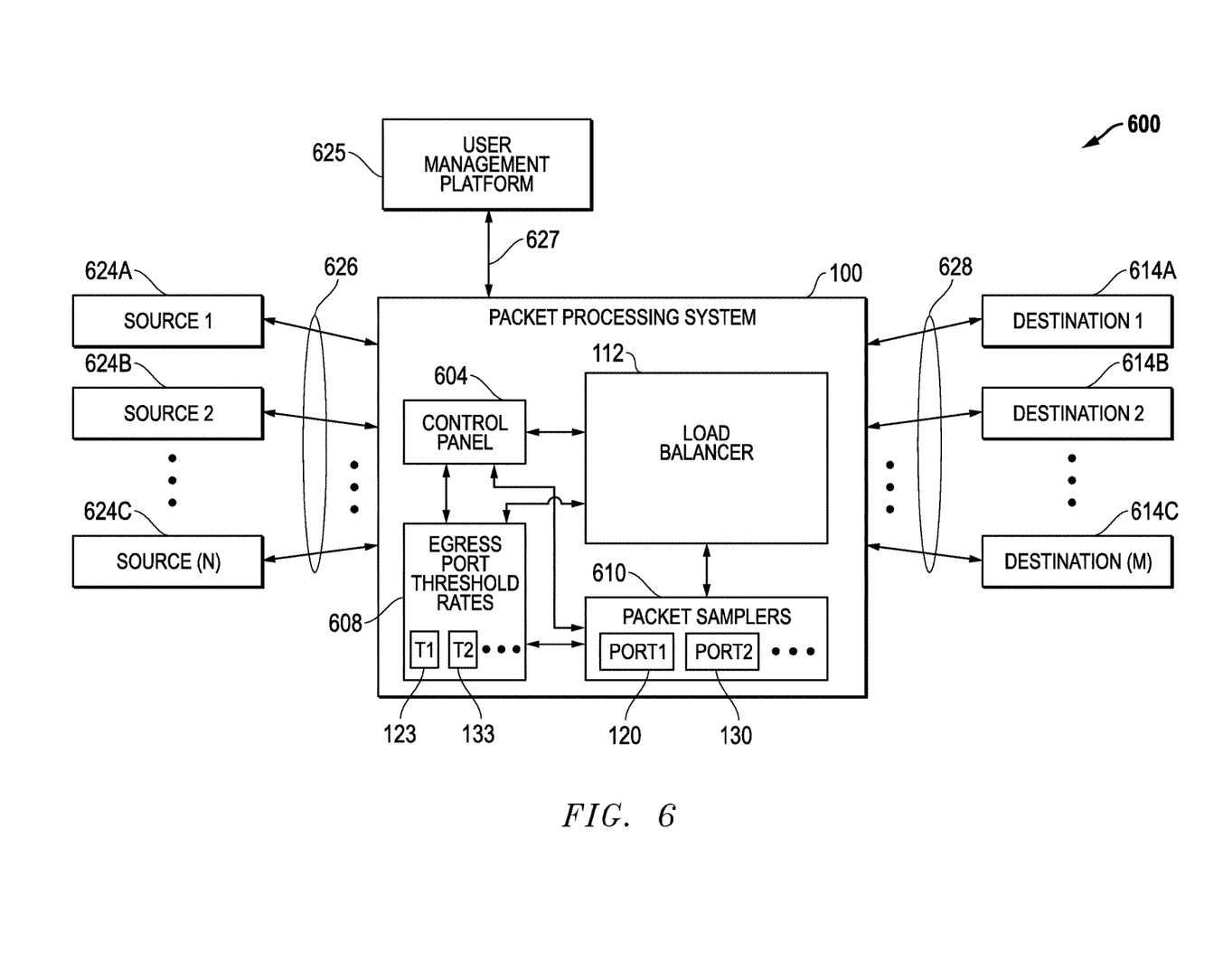
FIG. 6 is a block diagram of an example embodiment for a network environment including a control panel that provides a user interface for the packet forwarding system having a load balancer and packets samplers for different egress ports.

FIG. 6 is a block diagram of an example embodiment for a network environment 600 including a control panel 604 that provides a user interface for the packet forwarding system 100. As described herein, the packet forwarding system 100 includes a load balancer 112 and a plurality of packets samplers 610 such as sampler 120 associated with a first port (PORT1) and sampler 130 associated with a second port (PORT2). The packet forwarding system 100 receives copies of packet traffic from one or more network sources 624A, 624B . . . 624C through one or more network connections 626 and forwards these packets to one or more network destinations 614A, 614B . . . 614C through network connections 628. As described above, this packet forwarding can be based upon packet filters used to generate packet forwarding rules applied to filter engines 108. The load balancer 112 then load balances TOI packets within the packet forwarding system among a plurality of egress ports for the packet forwarding system 100, which are in turn coupled to the destinations 614A, 614B . . . 614C. The samplers 610 then operate to protect the egress ports and the network destinations 614A, 614B . . . 614C coupled to these egress ports from packet flow overload by dynamically adjusting port-specific sampling percentages applied to the load balanced TOI packets from the load balancer 112.

The packet forwarding system 100 allows a user or administrator to view, configure, control, and/or otherwise manage the packet forwarding system 100 through user management platform 625 connected to the control panel 604 for the packet forwarding system 100 through network connections 627. For example, the control panel 604 can be configured to provide a user interface (UI), such as graphical user interface (GUI), that can be accessed through the user management platform 625 to allow users/administrators to view, configure, control, and/or otherwise manage the packet forwarding system 100. In particular, users/administrators can specify or otherwise configure the egress port threshold rates 608, such as the threshold rate (T1) 123 for the first egress port (PORT1) 120 and the threshold rate (T2) 133 for the second egress port (PORT2) 134, through the user management platform 625 and the user interface provided by the control panel 604. Users/administrators can also specify and configure other parameters, such as session aware traffic processing, if desired. Other variations could also be implemented while still taking advantage of the dynamic port-specific packet sampling described herein to provide egress port overload protection.

The control panel 604 for the packet forwarding system 100 can be implemented, for example, as a web interface that can be accessed through a network browser (e.g., MICROSOFT Internet Explorer or MOZILLA Firefox) by other network-connected processing systems. For example, the packet forwarding system 100 can be configured to automatically download a control panel software application to the user management platform 625 when a network browser operating on the user management platform 625 connects to an IP address for the packet forwarding system 100. This download can occur the first time the network browser connects, and the control panel 604 can then be stored locally by the user management platform 625. The user management platform 625 can be, for example, personal computer systems, server systems, and/or other processing systems running WINDOWS operating systems, LINUX operating systems, and/or other operating system as desired. In one embodiment, the control panel 604 can in part be downloaded as JAVA-based software code or modules. Other implementations could also be implemented.

The source network traffic provided by connections 626 can be obtained through one of a variety of techniques and devices, such as for example, from network TAPs, from SPAN ports on network switches, and/or from other devices or systems that copy or otherwise obtain packets or packet contents from network traffic flows and make them available for other devices and systems. The network connections and communications described herein can include wired, wireless, and/or combinations of wired and wireless network communications among network-connected devices or systems and can include communications through one or more intervening devices or systems, such as firewalls, routers, switches, and/or other network-connected devices or systems. It is further noted that network visibility solutions, such as packet forwarding system 100, typically include hardware, software, or combined hardware and software implementations that filter, aggregate, and/or otherwise process packets from a network and make them available to one or more monitoring tools or other devices.

The network traffic sources 624A, 624B . . . 624C can include any of a wide variety of systems that are connected within a network communication system. These systems can include server systems, data storage systems, desktop computer systems, portable computer systems, network switches, broadband routers and/or any other desired processing systems that are connected into a cloud network, as desired. In addition to these systems, any number of network traffic destinations 614A, 614B . . . 614C can also be connected within the network communication system. Further, when implemented as network monitoring tools, the network traffic destinations 614A, 614B . . . 614C be can any of a wide variety of network related tools including traffic monitoring devices, packet sniffers, data recorders, voice-over-IP monitors, intrusion detection systems, network security systems, application monitors and/or any other desired network management or security tool device or system. Still further, as described herein, the sources 624A, 624B . . . 624C, the destinations 614A, 614B . . . 614C, the packet forwarding system 100, and/or the user management platform 625 can be implemented as virtual machines or instances within a virtual processing environment within a larger computing platform. It is further noted that the network communications can be based upon any desired protocol or combination of protocols including Ethernet protocols, multi-protocol label switching (MPLS) protocols, FibreChannel (FC) protocols and/or any other desired communication protocol that can be used for network communications including packet-based network communications.

It is noted that the functional blocks, systems, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are executed by one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to manage egress port packet flows for a packet forwarding system, comprising:
receiving input packets at one or more ingress ports for a packet forwarding system;
load balancing at least a portion of the input packets among a plurality of egress ports for the packet forwarding system to generate a plurality of subsets of load balanced packets, each subset being associated with an egress port; and for each egress port:
comparing a current traffic rate for the egress port to the threshold rate for the egress port;
sampling the subset of load balanced packets associated with the egress port using a sampling percentage based upon the comparing to generate sampled load balanced packets; and
outputting the sampled load balanced packets from the egress port;
wherein the sampling percentage for each egress port determines a percentage of the subset of load balanced packets associated with the egress port that are passed by the egress port;
wherein the sampling percentage for each egress port is 100 percent if the current traffic rate is less than the threshold rate for the egress port and is less than 100 percent if the current traffic rate is not less than the threshold rate for the egress port; and
wherein the sampling percentage for each egress port is proportional to the threshold rate for the egress port divided by the current traffic rate for the egress port if the current traffic rate is not less than the threshold rate for the egress port.

2. The method of claim 1, further comprising providing a user interface to allow configuration of the threshold rate for each of the egress ports.

3. The method of claim 2, wherein the threshold rate for each egress port is associated with a network monitoring tool coupled to the egress port.

4. The method of claim 1, further comprising filtering the input packets to generate packets representing traffic of interest (TOI), and wherein the load balancing comprises load balancing the TOI packets among the plurality of egress ports.

5. The method of claim 4, wherein the filtering comprises filtering the input packets with one or more filter engines having forwarding rules associated with one or more packet filters.

6. The method of claim 1, further comprising identifying within the input packets session traffic associated with one or more network communication sessions and indicating as non-session traffic input packets not identified to be associated with one or more network communication sessions.

7. The method of claim 6, further comprising generating hash signatures for the input packets and using the hash signatures to identify the session traffic.

8. The method of claim 7, further comprising using the hash signatures to identify request/response pairs for non-session traffic, and wherein the sampling drops or passes each request/response pair.

9. The method of claim 6, wherein the load balancing is applied to balance the session traffic and the non-session traffic among the egress ports, and wherein the sampling for each egress port is applied to sample only one of session traffic or non-session traffic within the subset of load balanced packets.

10. The method of claim 6, wherein the sampling for each egress port is applied to sample session traffic and non-session traffic within the subset of load balanced packets, and further comprising for each egress port sending at least one of session traffic to be dropped and non-session traffic to be dropped to another egress port within the packet forwarding system.

11. The method of claim 1, further comprising, for each egress port, determining packets to be dropped based upon the sampling percentage, and either dropping the packets to be dropped or forwarding the packets to be dropped to another egress port.

12. The method of claim 1, wherein the updating comprises updating the sampling percentage to be proportional to the threshold rate for the egress port and the current traffic rate for the egress port.

13. The method of claim 1, further comprising repeating the updating of the sampling percentage during operation.

14. The method of claim 13, wherein an update rate for the repeating is between 10 and 100 times the threshold rate.

15. A packet forwarding system having managed egress port packet flows, comprising:
one or more ingress ports configured to receive input packets;
a plurality of egress ports;
a load balancer coupled to receive at least a portion of the input packets and to distribute the received portion of input packets among the plurality of egress ports, a subset of load balanced packets being associated with each egress port; and
a plurality of samplers, each sampler being associated with an egress port and being configured to compare a current traffic rate for the egress port to a threshold rate for the egress port and to sample the subset of load balanced packets associated with the egress port using a sampling percentage based upon the comparison to generate sampled load balanced packets;
wherein each egress port is configured to output the sampled load balanced packets from the sampler associated with the egress port;
wherein each sampler is configured to use the sampling percentage to determine a percentage of the subset of load balanced packets associated with the egress port that are passed by the egress port;
wherein each sampler is configured to set the sampling percentage to 100 percent if the current traffic rate is less than the threshold rate for the egress port and to set the sampling percentage for the egress port to less than 100 percent if the current traffic rate is not less than the threshold rate for the egress port; and
wherein each sampler is configured to set the sampling percentage to be proportional to the threshold rate for the egress port divided by the current traffic rate for the egress port if the current traffic rate is not less than the threshold rate for the egress port.

16. The packet forwarding system of claim 15, further comprising a user interface, the user interface being configured to allow configuration of the threshold rate for each of the egress ports.

17. The packet forwarding system of claim 15, further comprising one or more filter engines configured to filter the input packets to generate packets representing traffic of interest (TOI), and wherein the load balancer is configured to receive and distribute the TOI packets among the plurality of egress ports.

18. The packet forwarding system of claim 17, wherein the one or more filter engines are configured to apply forwarding rules associated with one or more packet filters.

19. The packet forwarding system of claim 15, further comprising a session processor configured to identify within the input packets session traffic associated with one or more network communication sessions and to indicate as non-session traffic input packets not identified to be associated with one or more network communication sessions.

20. The packet forwarding system of claim 19, wherein the session processor is further configured to generate hash signatures for the input packets and to use the hash signatures to identify the session traffic.

21. The packet forwarding system of claim 20, wherein the samplers are configured to use the hash signatures to identify request/response pairs for non-session traffic and to drop or pass each request/response pair.

22. The packet forwarding system of claim 19, wherein the load balancer is configured to distribute session traffic and the non-session traffic among the egress ports, and wherein each sampler is configured to sample only one of session traffic or non-session traffic within the subset of load balanced packets.

23. The packet forwarding system of claim 19, wherein each sampler is configured to sample session traffic and non-session traffic within the subset of load balanced packets, and wherein each sampler is configured to send at least one of session traffic to be dropped and non-session traffic to be dropped to another egress port within the packet forwarding system.

24. The packet forward system of claim 15, wherein each sampler is further configured to determine packets to be dropped based upon the sampling percentage, and either to drop the packets to be dropped or to forward the packets to be dropped to another egress port.

25. The packet forward system of claim 15, wherein each sampler is further configured to update the sampling percentage to be proportional to the threshold rate for the egress port and the current traffic rate for the egress port.

26. The packet forward system of claim 15, wherein each sampler is further configured to repeatedly update the sampling percentage during operation.

27. The packet forward system of claim 26, wherein each sampler is further configured to use an update rate that is between 10 and 100 times the threshold rate.

* * * * *